(12) United States Patent
Kazuo et al.

(10) Patent No.: US 11,513,364 B2
(45) Date of Patent: Nov. 29, 2022

(54) LENS DRIVER FOR CAMERA

(71) Applicant: AAC Optics Solutions Pte. Ltd., Singapore (SG)

(72) Inventors: Shikama Kazuo, Osaka (JP); Yoshifumi Fujisaki, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 246 days.

(21) Appl. No.: 16/719,986

(22) Filed: Dec. 19, 2019

(65) Prior Publication Data
US 2020/0310149 A1 Oct. 1, 2020

(30) Foreign Application Priority Data
Mar. 29, 2019 (JP) .............................. JP2019-066944

(51) Int. Cl.
*G02B 27/64* (2006.01)
*G03B 5/00* (2021.01)

(52) U.S. Cl.
CPC ............. *G02B 27/646* (2013.01); *G03B 5/00* (2013.01); *G03B 2205/003* (2013.01); *G03B 2205/0023* (2013.01); *G03B 2205/0076* (2013.01)

(58) Field of Classification Search
None
See application file for complete search history.

(56) References Cited

U.S. PATENT DOCUMENTS

2018/0224665 A1* 8/2018 Im ........................ G02B 7/021
2018/0321504 A1* 11/2018 Hu ...................... G02B 27/646
2020/0221004 A1* 7/2020 Watanabe .............. H04N 5/349

* cited by examiner

*Primary Examiner* — Derek S. Chapel
(74) *Attorney, Agent, or Firm* — W&G Law Group

(57) ABSTRACT

Provided is a lens driver including a shake correction part, a lens module capable of driving in a direction horizontal to an optical axis of a reflected light, a shaft for supporting the lens module, an upper cover, a lower cover, a magnet, a coil, and a yoke. The shake correction part is provided with a prism, a prism cover, a second holding frame, a support part that performs double-shaft supporting, a shaft a of the shake correction part, and another shaft b of the shake correction part. The prism is rotatable in a direction a and a rotation direction b with respect to an optical axis of an incident light. The prism is mounted on the first holding frame on the fixture base. The lens driver provided can adjust movement of the optical axis, thereby achieving anti-dithering and thus obtaining good image quality.

8 Claims, 4 Drawing Sheets

LENS DRIVER FOR CAMERA

TECHNICAL FIELD

The present disclosure relates to the technical field of drivers, and in particular, to a lens driver for a camera having an anti-shake function.

BACKGROUND

With rapid development of photography technologies, lens drivers are widely used in various photographic devices. A lens driver is applied to various portable electronic devices, such as mobile phones, tablets, etc., which are particularly popular in consumers.

A driving mechanism of the lens driver suitable for a general portable electronic device is usually formed by a coil and a magnet, and the coil is fixed to a periphery of a lens holder. When a current is applied to the coil, the coil moves a lens holder in a direction of an optical axis of the lens due to an electromagnetic force, thereby enabling focusing. Moreover, when a user takes a picture by holding an electronic device with a hand, shaking of the hand will make the lens driver shake, and in this case, such a shaking can be corrected by driving in a direction perpendicular to the optical axis. However, for example, for a zooming optical system mounted on a small optical device of a portable electronic device and having a long optical length, it is difficult to directly mount it on the portable electronic device. Therefore, it is necessary to adopt a curving structure.

In an optical system using the curved structure, a lens disposed in front of and behind a prism or a reflecting mirror for making light curved is used for shake correction. However, in a portable electronic device that is developed in miniaturization, with such a shake correction structure disposed in front of and behind the lens, the curving optical system may have an increased length, or may have a structure in which a portion must be protruded.

Therefore, it needs to provide a new lens driver that can solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
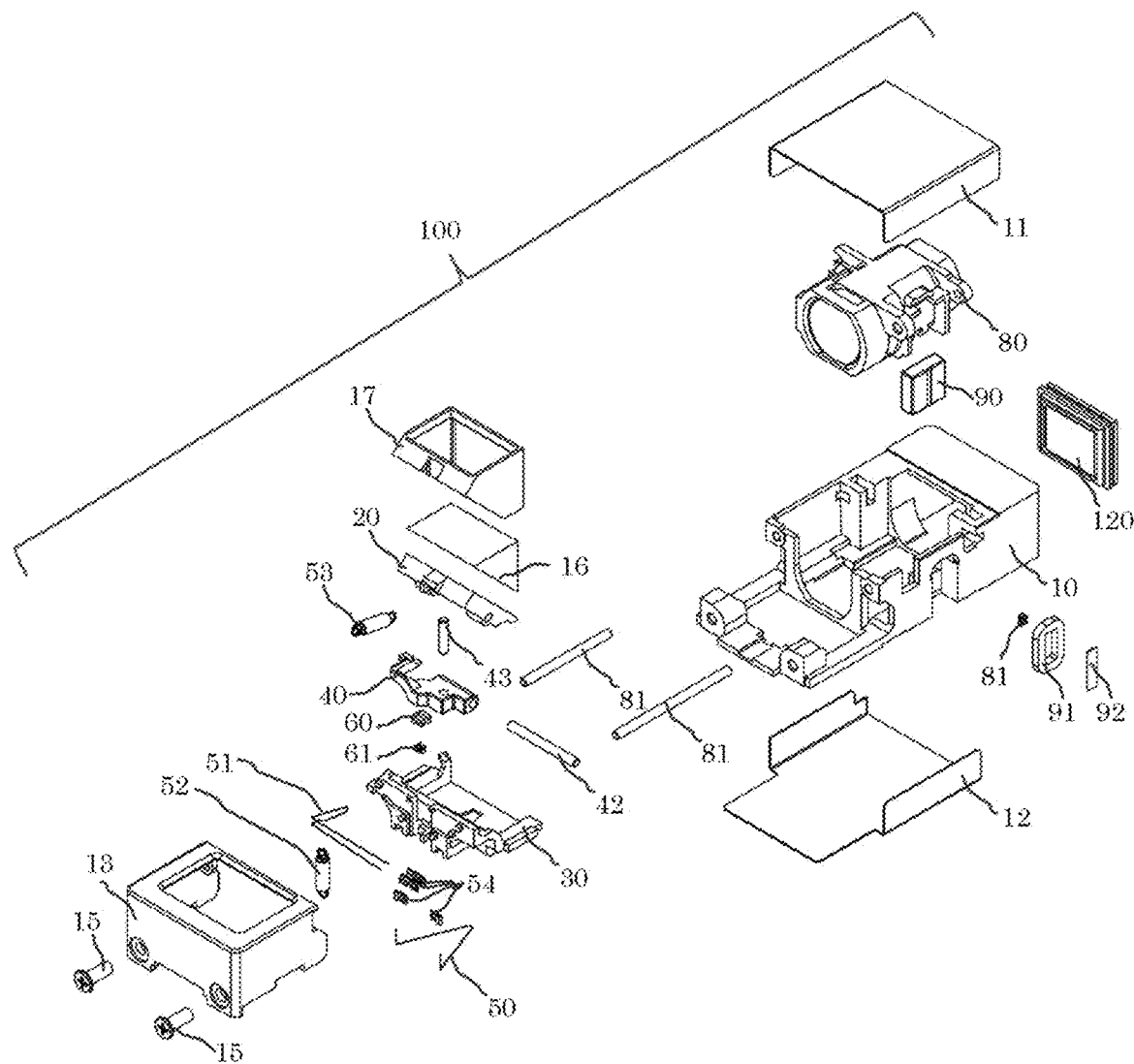
FIG. 1 is an exploded perspective view of a lens driver according to an embodiment of the present disclosure.
Figure 2:
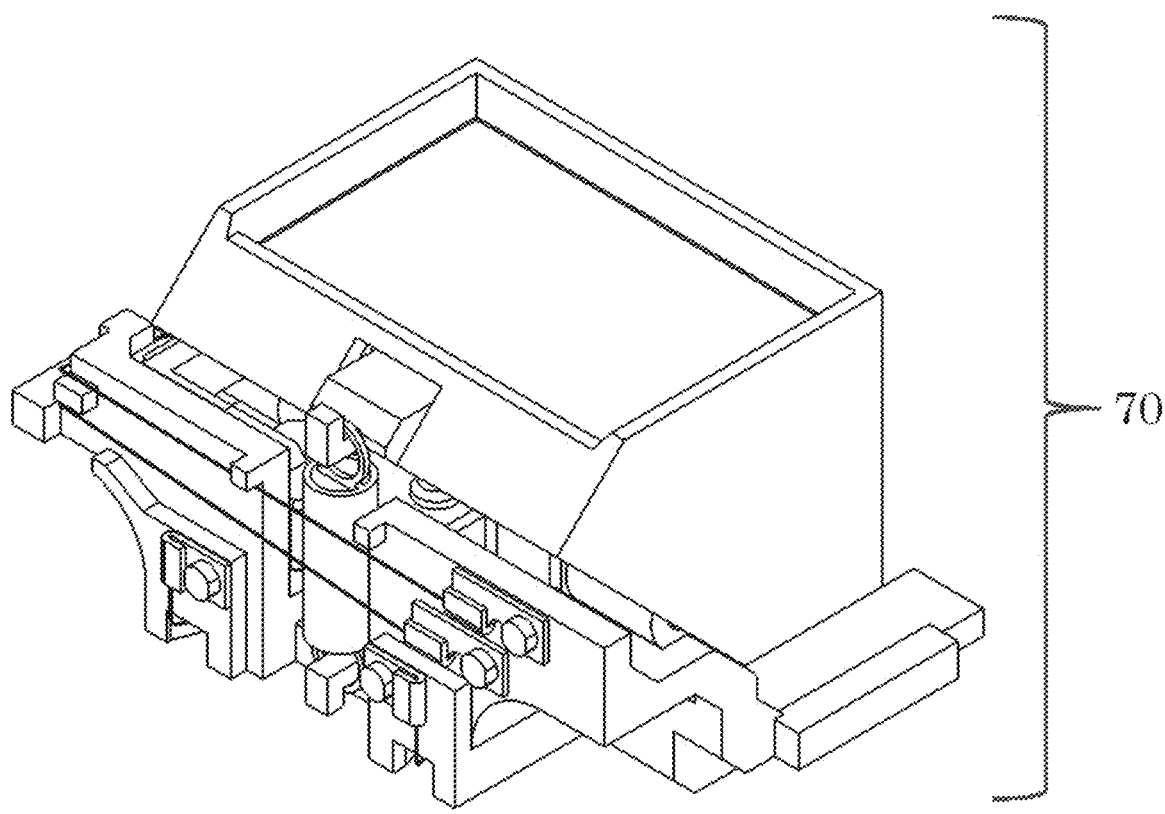
FIG. 2 is a perspective view of a shake correction part according to an embodiment of the present disclosure.
Figure 3:
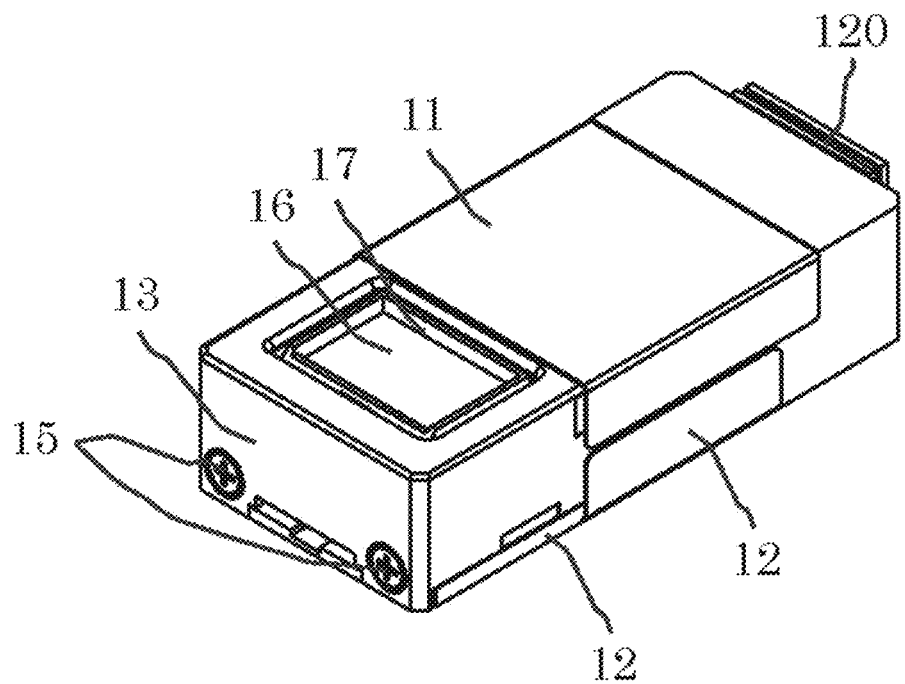
FIG. 3 is a perspective view of a lens driver according to an embodiment of the present disclosure.
Figure 4:
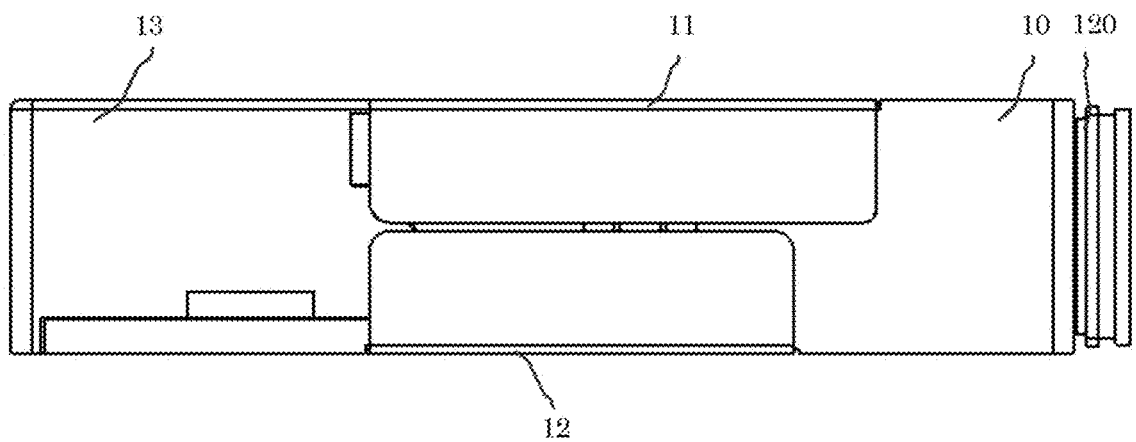
FIG. 4 is a side view of a lens driver according to an embodiment of the present disclosure.

In the following, the present disclosure will be described in details with reference to the accompanying drawings.

FIGS. 1-7 show a lens driver 100 according to the present disclosure.

The lens driver 100 includes a fixture base 10, a shake correction part 70, a lens module 80, a shaft 81 for supporting the lens module, a magnet 90, a coil 91, and a yoke 92.

The fixture base 10 has a receiving space 14, and the fixture base 10 is provided with an upper cover 11, a lower cover 12, a cover 13 of the shake correction part, and a fixture bolt 15 that form the receiving space 14.

In the shake correction part 70, a first holding frame 20 is provided with a prism 16 and a prism cover 17 as a curving part for making an optical axis be curved, and the first holding frame 20 is supported by a second holding frame 30 through a support part 40 that achieves double-shaft supporting, a shaft a42 of the shake correction part and a shaft b43 of the shake correction part. The prism 16 may also be a reflecting mirror (not shown).

The prism 16 makes an optical axis 110 of an incident light be curved, and then emits light along an optical axis 111 of a reflected light. Then, the light enters an imaging element 120.

Figure 5:
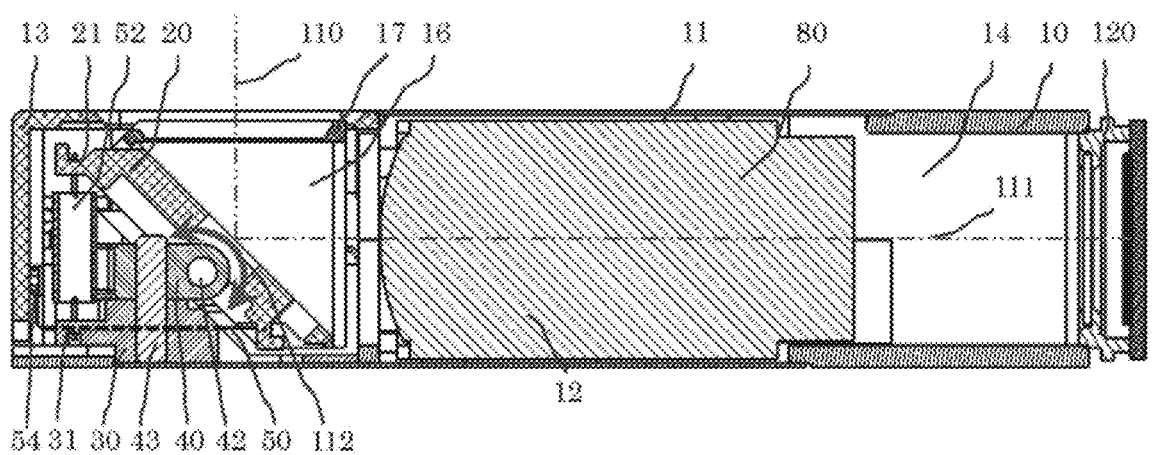
FIG. 5 is a side view of a lens driver according to an embodiment of the present disclosure and is a cross-sectional view of FIG. 4.
Figure 6:
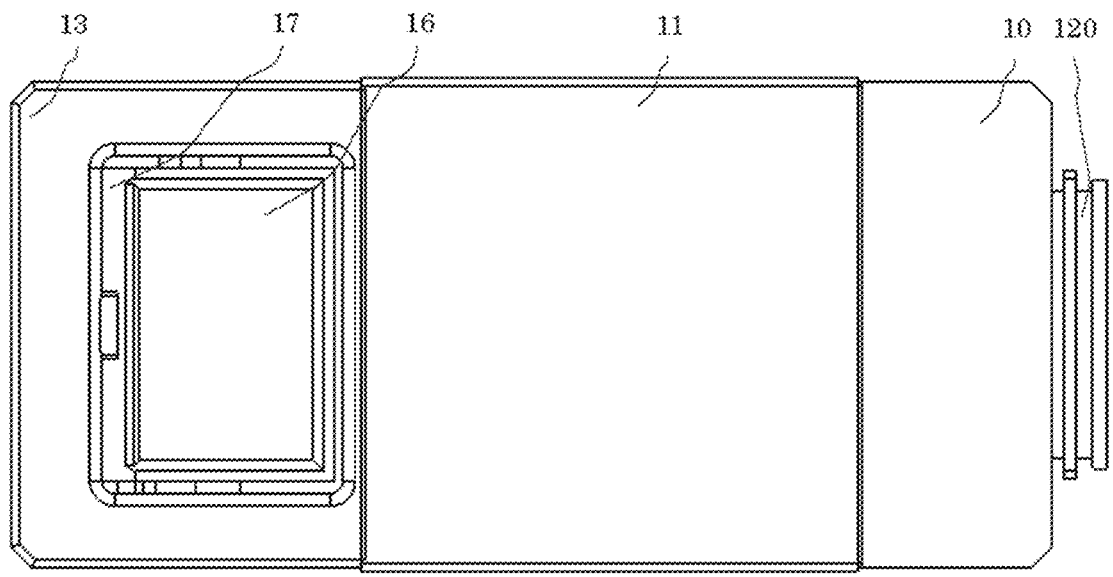
FIG. 6 is a front view of a lens driver according to an embodiment of the present disclosure.

The first holding frame 20 and the second holding frame 30 are rotatable in a rotation direction a112 as the shaft a42 of the shake correction part shown in FIG. 5 being a rotation center, and the first holding frame 20 and the second holding frame 30 are always forced by an elastic member a52 towards one side of the rotation direction. The elastic member a52 is supported by a support portion 21 of an elastic member of the first holding frame and a support portion 31 of an elastic member of the second holding frame.

Figure 7:
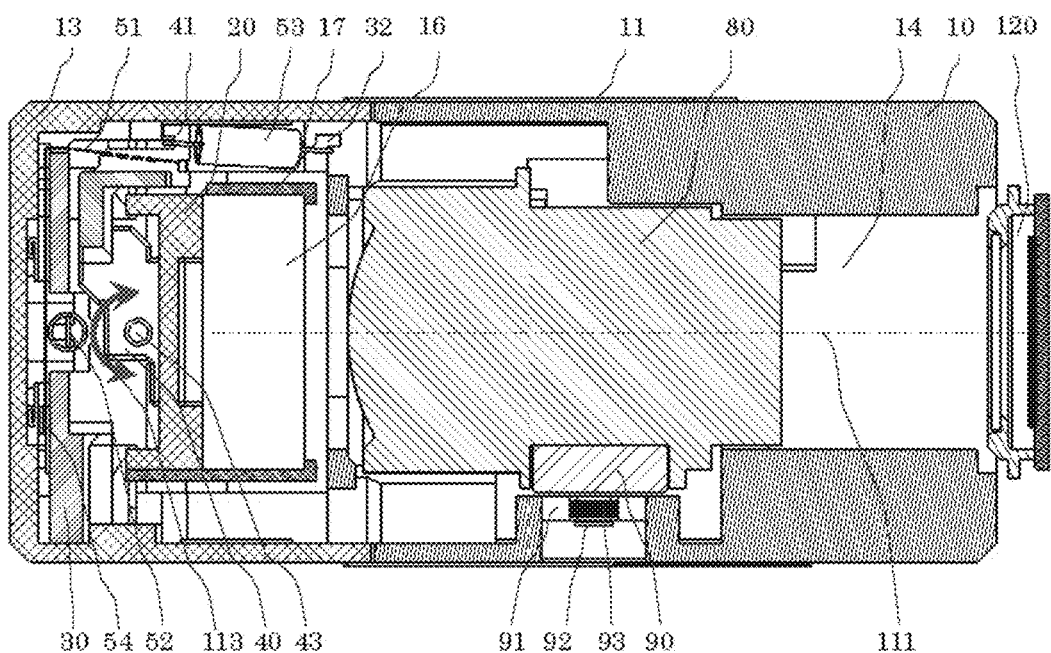
FIG. 7 is a front view of a lens driver according to an embodiment of the present disclosure and is a cross-sectional view of FIG. 6.

The first holding frame 20 and the second holding frame 30 are rotatable in a rotation direction b113 as the shaft b43 of the shake correction part shown in FIG. 7 being a rotation center, and the first holding frame 20 and the second holding frame 30 are always forced by an elastic member b53 towards one side of the rotation direction. The elastic member b53 is supported by a support portion 41 of an elastic member of the support part that performs double-shaft supporting, and a support portion b32 of the elastic member of the second holding frame.

A shape memory alloy a50 is a part for driving toward another side opposite to one side of the rotation direction a112 that is forced toward. The shape memory alloy a50 is mounted to the first holding frame 20 in a substantially folded shape. A tail end of the shape memory alloy a50 is supported by a fixing part 54 used for fixing the shape memory alloy and for energizing. The tail end of the shape memory alloy a50 is mounted to the second holding frame 30.

A shape memory alloy b51 is a part for driving toward another side opposite to one side of the rotation direction b113 that is forced toward. The shape memory alloy b51 is mounted to the first support part 40 that performs double-shaft supporting in a substantially folded shape. A tail end of the shape memory alloy b51 is supported by the fixing part 54 used for fixing the shape memory alloy and for energizing. The tail end of the shape memory alloy b51 is mounted to the second holding frame 30.

Since the shape memory alloy a50 and the shape memory alloy b51 can be arbitrarily driven by energizing, the shape memory alloy a50 and the shape memory alloy b51 can rotate freely in the rotation direction a112 and in the rotation direction b113. The optical axis can be rotated in response to shaking of the lens driver 100, and in this way, shape correction can be achieved.

In order to accurately detect driving by the shape memory alloy a50 and the shape memory alloy b51, for example, a magnetic detecting element a61 can be used. The magnetic detecting element a61 is configured to make a position detecting magnet 60 mounted to the support part 40 that performs double-shaft supporting be mounted to the second holding frame 30.

In an embodiment, a pair of shape memory alloys a50 and a pair of shape memory alloys b51 are provided. Each pair of shape memory alloys are disposed at opposite sides of the shaft that is the rotation center, and the pair of shape memory alloys are driven by attracting each other. It should be noted that, it is merely a preferred embodiment in which only one shape memory alloy a50 and only one shape memory alloy b51 are provided, so that those skilled in the art can better understand the present disclosure. However, this is not intended to limit the number of the alloys. Moreover, a combination of the magnetic detecting element a61 and the position detecting magnet 60, as a position detecting unit, also does not limit the scope of the present disclosure.

The shaft 81 for supporting the lens module supported by the fixture base 10 makes the lens module 80 be horizontally movable along a direction of the optical axis 111 of the reflected light.

The lens module 80 is provided with a magnet 90, and is mounted to the fixture base 10 in such a manner that the coil 91 is opposite to the magnet 90. A surface of the coil 91 that is not opposite to the magnet 90 is provided with a yoke 92, which is also fixed to the fixture base 10.

The lens module 80 is freely held in the direction of the optical axis 111 of the reflected light described above, and this action can be achieved by an electromagnetic action between the magnet 90 and the coil 91. In this way, a focus position can change in accordance with changing of a position of an object to be imaged.

When the lens module 80 moves due to changing of the focus position, the yoke 92 has a function of a magnetic spring for returning the magnet 90 to a given position, and moreover, the yoke 92 also has a function of applying a force towards a direction in accordance with radial shaking between the lens module 80 and the shaft 81 for supporting the lens module, and the yoke 92 further has a function of making magnetic leakage flux of the coil 91 converged and enhancing an electromagnetic efficiency of the magnet 90 and the coil 91.

By providing a magnetic detecting element b93 or the like inside the coil 91, the position of the magnet 90 can be detected, in this way, it achieves adjustment of the focus position with higher accuracy, and accurate control in a case where a focus adjustment speed is important.

The coil 91 may be a coil mounted and fixed to the fixture base 10, or may be a conductive pattern formed on a flexible substrate for wiring (not shown).

Although an example of supporting the lens module 80 using the shaft 81 for supporting the lens module has been described, in a preferred embodiment, the lens module 80 may be held by three balls (not shown) or the like in such a manner that the lens module 80 is freely movable in a direction horizontal to the optical axis 111 of the reflected light.

Figure 8:
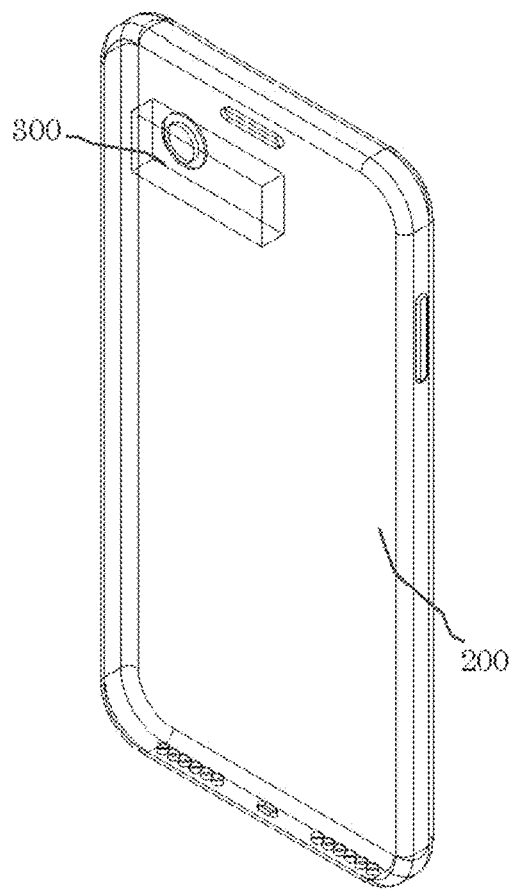
FIG. 8 shows a portable electronic device (portable information terminal) including the lens driver according to an embodiment of the present disclosure.

The lens driver 100 described above can also be used in, for example, an imaging device 300 for a portable information device 200 such as a smart cellphone, a functional cellphone or a tablet device as shown in FIG. 8.

According to the lens driver 100 provided by the present disclosure, it can achieve adjustment of movement of the optical axis of the lens, so that a purpose of anti-shake can be achieved, thereby improving quality of image.

The above description is merely related to preferred embodiments of the present disclosure, which do not make limitations to the scope of the present disclosure, and all equivalent modifications or variations made by those skilled in the art based on the present disclosure shall fall into the protection scope of the present disclosure.

REFERENCE SIGNS

10 fixture base
 11 upper cover
 12 lower cover
 13 cover of shake correction part
 14 receiving space
 15 fixture bolt
 16 prism
 17 prism cover
 20 first holding frame
 21 support portion of elastic member of first holding frame
 30 second holding frame
 31 support portion a of elastic member of second holding frame
 32 support portion b of elastic member of second holding frame
 40 support part that performs double-shaft supporting
 41 support portion of elastic member of support part that performs double-shaft supporting
 42 shaft a of shake correction part
 43 shaft b of shake correction part
 50 shape memory alloy a
 51 shape memory alloy b
 52 elastic member a
 53 elastic member b
 54 fixing part used for fixing shape memory alloy and for energizing
 60 position detecting magnet
 61 magnetic detecting element a
 70 shake correction part
 80 lens module
 81 shaft for supporting the lens module
 90 magnet
 91 coil
 92 yoke
 93 magnetic detecting element b
 100 lens driver
 110 optical axis of incident light
 111 optical axis of reflected light
 112 rotation direction a
 113 rotation direction b
 120 imaging element
 200 portable information device
 300 imaging device

What is claimed is:

1. A lens driver, comprising:
a curving part having a reflecting surface for making an optical axis be curved;
a holding frame for holding the curving part;
a lens module having a set of lenses;

a fixture base having a receiving space; and a cover matching the fixture base to form the receiving space, wherein the curving part having the reflecting surface for making the optical axis be curved is rotated relative to the fixture base so as to perform shake correction, the curving part having the reflecting surface is held on a first holding frame, the first holding frame is held on a second holding frame in a freely rotatable manner, and the second holding frame is mounted to the fixture base, and a shape memory alloy is used as a driving source of the lens driver for rotating the curving part;

the curving part having the reflecting surface is shared in two rotation directions, the curving part having the reflecting surface is forced by an elastic member to keep rotation towards one end with a rotation center of one rotation direction being a fulcrum, and the curving part having the reflecting surface is driven by the shape memory alloy to rotate towards another end;

the first holding frame for supporting the reflecting surface is shaft supported by a support part, and the support part limits a rotation direction and performs double-shaft supporting.

2. The lens driver as described in claim 1, wherein the shape memory alloy as the driving source is always held in tension and is arbitrarily driven after being energized.

3. The lens driver as described in claim 1, wherein the curving part having the reflecting surface is freely rotatable towards at least two rotation directions being mutually perpendicular axes, so as to perform the shake correction.

4. The lens driver as described in claim 1, wherein the curving part is a prism.

5. The lens driver as described in claim 1, wherein the curving part is a reflecting mirror.

6. A camera, comprising the lens driver as described in claim 1.

7. A portable electronic device, comprising the camera as described in claim 6.

8. The lens driver as described in claim 1, wherein the curving part having the reflecting surface is freely rotatable towards a first rotation direction and a second rotation direction being mutually perpendicular axes, so as to perform the shake correction, and the shape memory alloy comprises a first shape memory alloy and a second shape memory, the first shape memory alloy is driving the curving part move towards the first rotation direction, and the second shape memory alloy is driving the curving part move towards the second rotation direction.

* * * * *